July 29, 1924.  
A. R. BERG  
MICROMETER GAUGE  
Filed Oct. 19, 1921  
1,502,806  
2 Sheets-Sheet 2
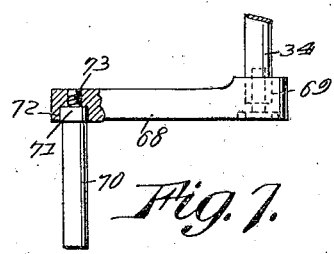
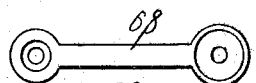
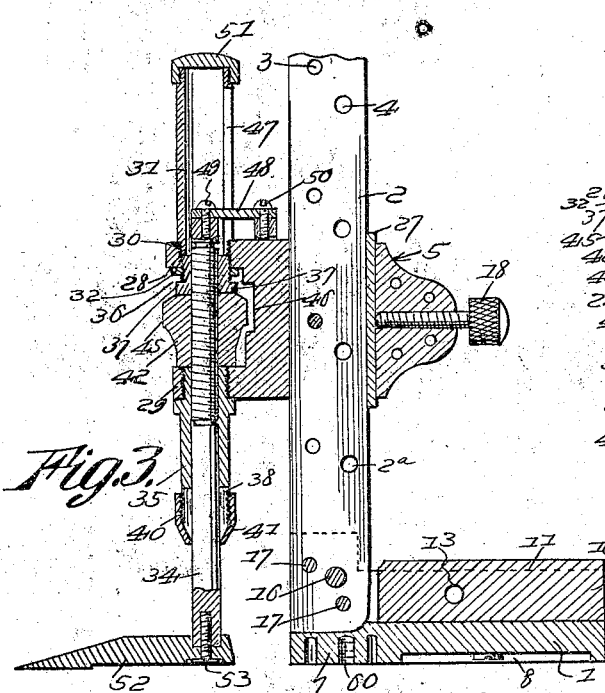
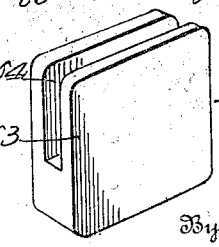
Inventor  
Albert R. Berg,  
By Watson E. Coleman  
Attorney Patented July 29, 1924.

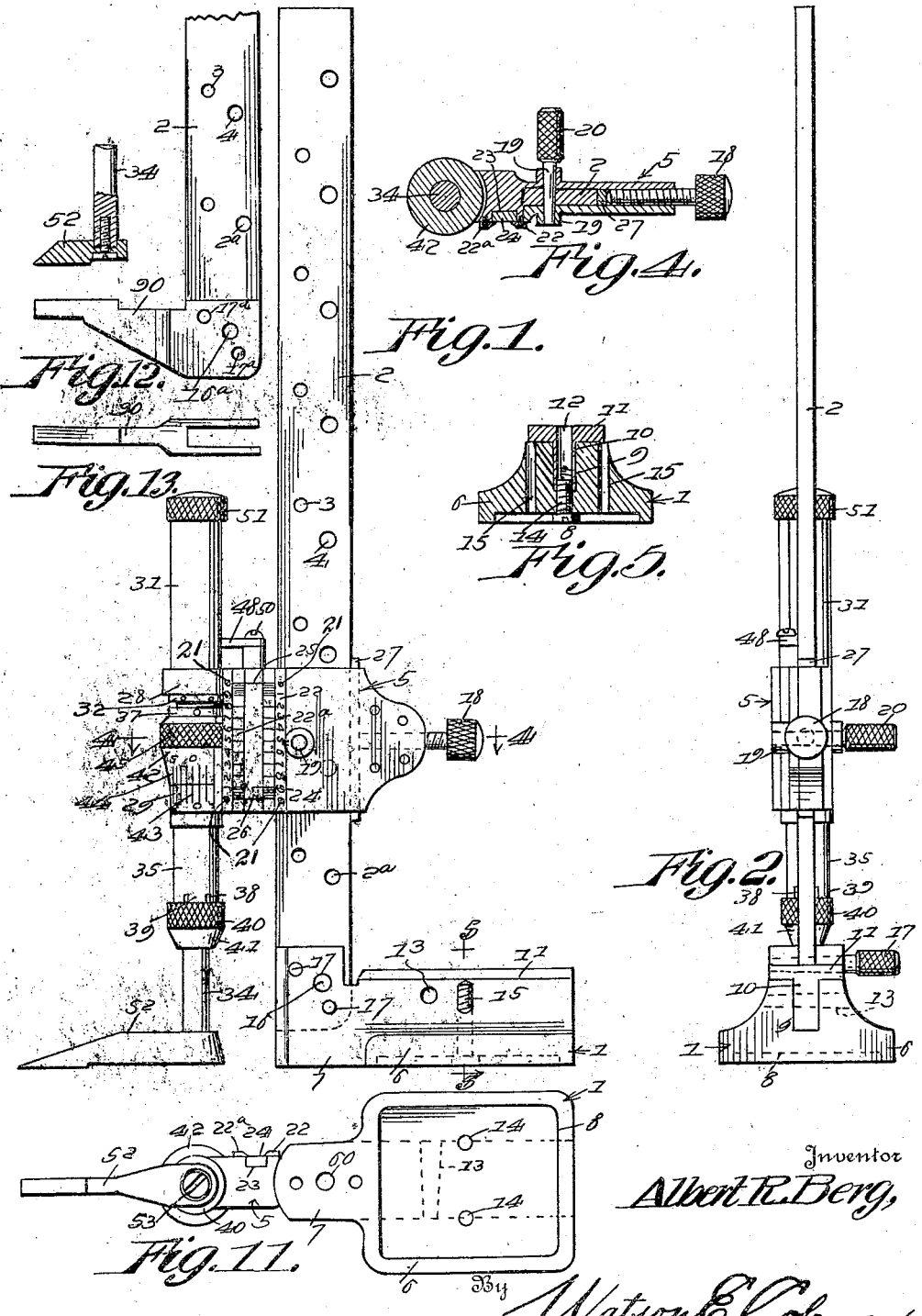

1,502,806

UNITED STATES PATENT OFFICE.

ALBERT R. BERG, OF ROCHESTER, NEW YORK.

MICROMETER GAUGE.

Application filed October 19, 1921. Serial No. 508,661.

*To all whom it may concern:*

Be it known that I, ALBERT R. BERG, a citizen of the United States, residing at Rochester, in the county of Monroe and State of New York, have invented certain new and useful Improvements in Micrometer Gauges, of which the following is a specification, reference being had to the accompanying drawings.

It is maintained that the majority of micrometer measuring instruments for measuring heights, and making inside and outside measurements have their scales of graduations of such small dimensions, therefore cut in diminutive sizes, that a mechanic or machinist is very apt to read the measurements incorrectly, unless a microscope or magnifying glass be used, therefore the present invention aims to provide a micrometer gauge, wherein the scale of graduations may be correctly read in (.0001) ten thousandths of an inch with the naked eye.

Another purpose is the provision of a micrometer gauge of this character, wherein height, inside and outside and like minute measurements may be correctly made, and to accomplish this, it is a further aim to provide opposed scales of graduations arranged in opposite orders, in connection with a measuring slide scale having upper and lower zero indications, whereby heights may be measured with one set of graduations, and the other used in connection with another scale of graduations for making inside measurements. The scale of graduations which is used for measuring heights is also used for making outside measurements.

Micrometer gauges heretofore used have extra graduations, which cause considerable confusion in figuring out the measurement, causing consumption of considerable time, and very often such mistakes occur at times that a job is spoiled, necessitating days and some times weeks to remedy. Now in the present device very minute measurements may be made with accuracy, and the measurements easily read. The feeler or scriber of the present gauge can be adjusted to any angle, and the measurements of many articles may be taken with accuracy.

Still another purpose is to provide a gauge of the present character, which is very simple, efficient and practical in construction, and will greatly facilitate the work of the mechanic or machinist, since the measurements can be made quickly and accurately.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in side elevation of the improved micrometer gauge constructed in accordance with the invention;

Figure 2 is a view in elevation at right angles to that shown in Figure 1;

Figure 3 is a vertical sectional view;

Figure 4 is a sectional view on line 4—4 of Figure 1;

Figure 5 is a sectional view on line 5—5 of Figure 1;

Figure 6 is a view in side elevation of the caliper jaws 55 and 56;

Figure 6$^a$ is a plan view of Figure 6;

Figure 7 is a view in side elevation of the depth gauge showing a part thereof in section;

Figure 7$^a$ is a plan view of the depth gauge;

Figure 8 is a view in side elevation showing the carriage reversed on the scale slide or blade;

Figure 9 is a plan view of the link 48;

Figure 10 is a perspective view of the fixture 63 for registering the ends of the caliper jaws 55 and 56;

Figure 11 is a bottom plan view of the micrometer gauge in Figure 1; and

Figure 12 is a view in elevation showing a modified form of caliper jaws, for the blade 2 and the micrometer screw.

Figure 13 is a plan view of the caliper jaw 90.

Referring to the drawings, one designates the base of the gauge, while 2 denotes a standard rising upwardly from the base. This standard is provided with two sets of openings 3 and 4, used to receive fastening pins, for holding the micrometer carriage 5 in different adjusted positions thereon. The base 1 comprises a wide portion 6 and a contracted portion 7. The under face of the base is hollowed out as shown at 8, for the reception of the heads of holding screws to be hereinafter described. The upper part of the base is provided with a groove 9, the greater portion of which is adapted to receive the contracted flange 10 of what may be termed an anvil 11.

The anvil 11 has a vertical threaded opening 12, which extends through the flange 10, and the smaller end receives the threaded shank of a screw 14, which may be tightened securely, to draw the anvil in such wise as to set solid on the base 1. The base 1 is also provided with openings or holes 15 extending vertically, one upon each side of the center of the base. The base also has a transverse hole or opening 13. The purpose of these openings 13 and 15 will be hereinafter set forth.

The blade or standard 2 has its lower end resting in the other smaller end of the groove 9 of the base, there being a screw 16 passing through the opposite walls which are caused to be formed by the groove 9, and through the lower end of the blade or standard, in order to support the same perpendicularly. In order to insure such perpendicular position of the blade 2, tapered pins 17 are engaged through the walls of the base caused to be formed by the groove 9, and through the lower end of the blade, thereby preventing any vibration or movement whatever of the blade or standard relatively to the base. It is obvious that the pins 17 may be removed, and the blade allowed to be tilted until it rests in the greater portion of the groove 9 of the base, whereby the blade and the base may be folded toward each other and hence reduce the gauge to a small compass.

When the pins 17 are removed, the anvil is also detached, and as previously stated the blade 2 is then moved pivotally until it engages the groove 9, it being obvious that the opening 13 is the same distance from the pivot 16, as the pivot is from an opening 2$^a$ in the blade 2, so that a pin (not shown) may engage through the openings 2$^a$ and 13, and hold the blade in such a position. The pins 17 when removed are placed in the openings 15 for storage, when the blade is disposed in the groove 9. In this way the pins 17 are always handy and ready for use.

The carriage 5 is mounted for movement upon the blade or standard 2, and may be held in different adjusted positions by the set screw 18. The opposite walls of the carriage 5 have registering openings 19, for the reception of a pin 20, which is designed to engage any one of either set of openings or apertures 3 and 4, in order to hold the carriage in different fixed positions on the standard or blade. The screw 18 is first tightened, in order to hold the carriage set, until the pin 20 is inserted. It will be noted that the two sets of perforations or openings in the blade are spaced an inch apart, the lower one being spaced two inches from the bottom of the base. The carriage 5 comprises a body through which the blade 2 passes, and adjacent the body the carriage has secured to the side thereof by means of screws 21 graduated strips 22 and 22$^a$. Arranged in a groove 23 intermediate the graduated strips is a sliding graduated strip 24, which is provided on its outer face with upper and lower zero graduations or indications 25 and 26, which cooperate with the graduated strips 22 and 22$^a$. It will be noted that the graduations on the strip 22$^a$ arrange from zero at the bottom to $\frac{1}{10}$ of an inch at the top. The graduations on the strip 22 extend from zero at the top to a graduation, which discloses the fact that the strip is divided into 10 equal parts. The strip 24 is designed to cooperate with the graduations of the strip 22$^a$, for the purpose of measuring heights and taking outside measurements and the like. The zero strip 24 also cooperates with the graduations on the strip 22, for the purpose of taking inside measurements and the like.

A gib or insert 27 is inserted in the passage of the carriage 5 adjacent one wall of said passage and is engaged by the locking set screw 18, which bears the gib or insert 27 against one edge of the blade 2, for the purpose of holding the carriage in different positions, while the pin or plug 20 is being inserted.

The carriage is provided with upper and lower bearings 28 and 29, the former being interiorly threaded and receives the reduced threaded extension 30 of the micrometer screw protecting sleeve or tube 31. A lock nut 32 is threaded on the reduced extension 36 of a check nut 37. In fact this lock nut 32 cooperates between the shoulder of the check nut 37 and the upper bearing 28, and is designed to engage tight against the lower surface of the upper bearing 28, to hold and lock the check nut 37 in its adjusted positions. Mounted to engage and operate in the sleeve or tube 31 is the upper end of a micrometer screw 34, the lower portion of which operates through a guide sleeve 35. The upper end of the sleeve 35 has a reduced threaded extension, which is threaded into the lower bearing 29. The lower end of the guide sleeve 35 is provided with a plurality of diametrically opposite slots 38, causing to be formed intermediate spring projections 39. The lower end of the guide sleeve 35 is tapered as indicated at 40, and is also threaded as shown to receive the adjusting bearing nut 41. The micrometer screw 34 not only engages the sleeve or tube 31, but also the check nut 37 and the guide sleeve 35. It is obvious that after the micrometer screw 34 is adjusted by means of the micrometer nut 42, the adjusting bearing nut 41 may be tightened, drawing the spring projections 39 toward and in contact with the micrometer screw, and holding the same from rattling, or from movement.

The outer surface of the bearing 29 of the carriage is provided with a series of graduations 43, with which the graduations 44 on the lower tapered reduced part of the micrometer nut cooperate, in order to indicate the amount of adjustment imparted to the micrometer screw 34. The micrometer nut 42 has a knurled head 45, which engages a recess 46 of the carriage, at a point between the bearings 28 and 29, so as to hold the micrometer nut in position and against movement relatively to the carriage, and to adjust the micrometer screw.

The sleeve or tube 31 is provided with a slot 47 through which the connecting link 48 engages, that is the contracted portion of the link. This link is connected to the upper end of the micrometer screw 34 by means of a screw 49 and has its other end connected to the upper end of the slide 24 by means of a screw 50, therefore when the micrometer screw 34 is adjusted, the slide 24 is likewise adjusted relatively to the scale strips 22 and 22ᵃ. A cap 51 is threaded to the upper end of the tube or sleeve 31 for the purpose of closing the same and preventing dust or other foreign matter from entering the sleeve.

A height gauge 52 may be fastened to the lower end of the micrometer screw 34 by means of a screw 53, which passes through the height gauge 52 and has its shank threaded into the micrometer screw. In fact the lower end of the micrometer screw 34 engages a depression in the height gauge, in order to insure a rigid connection between the height gauge and the tube. When measuring heights of different objects, the base 1 is disposed so as to rest firmly and freely on a base upon which the object or element to be measured rests. The carriage is then adjusted by the manipulation of the screw 18 and the pin 20, then in order to make the minute measurements the micrometer nut 42 is rotated, for raising and lowering the micrometer screw 34, until the sharpened or pointed portion 54 of the height gauge assumes a proper position relatively to the top of the element or object being measured, or relatively to a point or certain location on the object or element to be measured, and since the slide 24 is movable with the micrometer screw, the graduation indication 26 on the slide 24 will cooperate with the graduations on the strip 22ᵃ, thereby giving the exact height of the element or object being measured.

Other implements or attachments may be connected to the lower end of the micrometer screw 34, for making other measurements. For instance the upper and lower caliper jaws 55 and 56 may be employed. The former has a depression 57 to receive the lower end of the micrometer screw, it being obvious that the same screw 53 which previously connected the height gauge 52 to the lower end of the screw 34, may be engaged through the upper jaw 55 and threaded into the lower end of the micrometer screw 34, thereby holding the jaw 55 securely and firmly in position. The other caliper jaw 56 comprises a body portion 58, through which a thumb screw 59 engages. The shank of this screw threads into a cavity 60 of the base 1, in order to tighten the caliper jaw 56 in position. To insure holding the caliper jaw 56 rigid, pins 61 engage through openings 62 of the body of the caliper jaw 56, and into the base 1. The adjacent ends of the caliper jaws 55 and 56 are simply constructed as shown, and are adapted for making inside measurements, for instance on the interior of a tube or other object. To accomplish this result the carriage is adjusted on the blade 2, to approximate the distance of the interior of the tube or other object, then the micrometer nut 42 may be rotated, whereby the micrometer screw may be adjusted, and in this case the caliper jaw 55 will contact with the side of the interior of the tube or other object being measured, while the other caliper jaw 56 will engage the opposite side of the interior of the tube or other object. Since the slide 24 is movable with the micrometer screw 34, the graduation or scale indication 25 on the slide 24 will cooperate with the graduations on the scale strip 22, and thereby give the minute measurement of the interior of the tube or other object, which is being measured.

It is obvious that the caliper jaws 55 and 56 may be adjusted at any angles about the micrometer screw 34 as a center. However this is not as a rule necessary.

Also the height gauge 52 may be adjusted at any angle about the lower end of the micrometer screw as a center.

When the caliper jaws 55 and 56 are positioned for taking inside measurements (though it is obvious that outside measurements may be taken as well) an adjusting fixture or plate 63 provided with a slot 64 is employed. In fact the caliper jaws 55 and 56 are positioned approximately in place, then the plate or fixture 63 is arranged, so that the slot or recess 64 will straddle the correspondingly shaped ends 65 of the caliper jaws, and align them, in order to make and insure inside and outside measurements, preferably the former in this instance. The lower caliper jaw 56 has an opening 66 immediately in alignment with the micrometer screw 34, in order to permit of the insertion of a screw-driver therethrough, for the purpose of adjusting or tightening the screw 53, which connects the upper caliper jaw 55 to the micrometer screw. In order to hold the securing pins 62 in position, suitable set screws 67 are engaged laterally through the body of the lower caliper jaw 56, in order to contact with the pins 62.

A depth gauge 68 may be attached to the lower end of the micrometer screw, by means of the pin 53, which threads into the lower end of the micrometer screw. In fact the depth gauge has a depression 69, in which the lower end of the micrometer screw engages, as in the case when the height gauge and caliper jaw 55 are attached to the screw. The depth gauge extends laterally of the micrometer screw, and projecting downwardly from the body of the depth gauge is a depth gauge pin 70, the integral collar 71 of which engages a recess 72 of the body of the depth gauge, while the reduced extension 73 of the depth gauge pin is threaded into the body of the depth gauge, to hold the pin 70 rigid relatively thereto. In making depth measurements, the base 1 is placed firmly in position on a surface above and surrounding the cavity or hole, the depth measurements of which are to be taken, then the micrometer screw 34 is adjusted by manipulating the micrometer nut 42, and since the slide 24 is operable with the screw 34, its graduation or indication 25 will cooperate with the graduations of the strip 22, in order to give the depth of the cavity or hole being measured. The micrometer screw 34 is adjusted until the lower end of the depth gauge pin 70 engages with the bottom of the cavity, or with a surface below the surface on which the base 1 rests. It is obvious that longer or shorter depth gauge pins 70 may be used, as there is no limitation on the length.

An anvil or contact member 74 may be attached to the lower end of the micrometer screw, to cooperate with the anvil 11 which is mounted upon the base 1, for making other measurements. In fact the contact member 74 comprises a body 75 and a screw shank 76. The body 75 has a plurality of depressions 77 to receive the pin or other instrument (not shown), whereby the contact member may be tightened in place on the lower end of the micrometer screw.

When using the test block hammer the carriage 5 is reversed, so that the micrometer screw 34 will assume a position over the base, directly in alignment with the center of the anvil, and those objects to be measured by the test block hammer and the anvil, are placed between the contact member and the anvil. When the carriage is placed in reversed position on the blade or standard 2, the pin 20 engages through any one of the openings 4, while the set screw 18 engages on the other edge of the blade 2. When the carriage is so arranged the micrometer screw is adjusted by the micrometer nut 42, so that the slide 24 may cooperate with the scale strip 22$^a$, thereby making the measurements of the object or element placed between the contact member 70 and the anvil 11. The check nut 37 is provided with a plurality of radial depressions 78, to receive a pin or other instrument for the purpose of adjusting the check nut in the bearing 28 of the carriage.

It will be noted that the depth measuring pin 70 can be used three different ways, for instance it may be used as shown in Figure 7, with the base as disposed in Figure 1, or used as in Figure 7 with the carriage reversed, in fact disposed over the base, or the depth pin 70 can be detached from 68 and connected direct to the lower end of the micrometer screw 34, as in Figure 3.

Also it is to be noted that depth pins similar to 70 may be of different proportions, in fact they may be very much smaller in diameter than that which is shown in Figure 7, and in this instance the reduced threaded extension 73 of a depth pin reasonably small in diameter may be connected direct to the lower end of the micrometer screw 34. In this instance, the opening 12 formed through the anvil and through the base 1, when the carriage is reversed so that the micrometer screw is over the base, is directly in axial alignment with the micrometer screw, so that the depth measuring pin 70 may be used for measuring small tools or anything that has a hole or hollow form. In fact the depth gauge such as similar to 70, but reasonably smaller, may enter the opening 12, in order to measure very small hollow parts.

The present gauge can be made to read in any form of graduations, for instance in (m. m.) or the metric system, as well as the English system or in inches.

Certain concerns or companies only have use for inside and outside calipers, but have no use for height gauges, therefore in order to comply with the demands of such concerns, the base 1 can be eliminated, as well as the caliper jaw 56, and in lieu thereof, a caliper jaw such as indicated at 90 in Figure 12, is attached to the blade 2 by means of a pivot pin 16$^a$. In this instance pins 17$^a$ are used to fasten the caliper jaw 90 to the lower end of the blade 2, while the micrometer screw is designed to cooperate with the caliper jaw 90. In fact the jaw 90 may cooperate with an upper caliper jaw such as 52$^a$.

The invention having been set forth, what is claimed as being useful is:

1. In a measuring gauge for the purpose indicated, a base having a blade, a carriage operatively adjustable on the blade and provided with two sets of graduations which progress in opposite directions, a micrometer screw operatively mounted on the carriage parallel to the blade, a gauge implement carried by one end of the micrometer screw for cooperation with the base for making measurements, and means carried by the micrometer screw and arranged between the latter and the blade for cooperating with the graduations on the carriage to indicate various measurements.

2. In a measuring instrument for the purpose described, a blade, a carriage operatively adjustable thereon and provided with two spaced sets of graduations which progress in opposite directions, a micrometer screw carried by and adjustable relatively to the carriage and having means operating between the sets of graduations for indicating measurements, and cooperative means carried by one end of the micrometer screw and one end of the blade for making measurements.

3. In a micrometer gauge, a blade, a carriage adjustable thereon and reversible whereby it may extend from either edge of the blade, a micrometer screw carried by the carriage and adjustable relatively thereto and in parallel relation to the blade, cooperative graduated means carried by the micrometer screw and the carriage for indicating measurements, and cooperative means carried by the corresponding ends of the micrometer screw and the blade for making measurements, means for preventing lost motion of the screw, means for guiding the micrometer screw, and means associated with the micrometer screw for checking up the adjustment of the latter.

4. In a micrometer gauge, a blade, a carriage operatively adjustable thereon and provided with two sets of graduations, a micrometer screw adjustably mounted on the carriage and having a movable slide cooperating with the graduations for indicating measurements, and cooperative means carried by the micrometer screw and one end of the blade for making measurements, and means associated with the micrometer screw for checking up the adjustments of the latter.

5. In a micrometer gauge, a blade, a carriage mounted for longitudinal adjustment thereon and provided with guide tubes, one guide tube having a guide slot, said carriage having graduations, a micrometer screw mounted in the guide tubes, a slide cooperative with the graduations for indicating measurements, means passing through the guide slot of one of the guide tubes and connecting the micrometer screw and the slide whereby the latter may move with the former, and cooperative means carried by the corresponding ends of the micrometer screw and the blade for making measurements.

6. In a micrometer gauge, an elongated blade, a carriage mounted for longitudinal adjustment thereon, a micrometer screw mounted on the carriage for adjustment relatively thereto, a slide carried by the micrometer screw, the carriage having graduations cooperating with the slide for indicating measurements, and jaws carried by the corresponding ends of the micrometer screw and the blade for making measurements.

7. In a micrometer gauge, a blade, a carriage adjustable longitudinally thereof and having graduations for making measurements, a base for the blade provided with a slot, said blade being movable into said slot, said measurement means being adjustable over the base when the blade assumes a position at right angles to the base, and an anvil mounted in the slot of the base to cooperate with the measurement means of the blade when it is disposed over the base for making other measurements.

8. In a micrometer gauge, a blade, a carriage mounted for longitudinal adjustment upon the blade, guide tubes detachably connected to the carriage, and having their axes in the same straight line, one of said guide tubes having a guide slot, a micrometer screw guided through one of said tubes and provided with a lateral member guided in the slot of the other tube, means for adjusting the screw and including graduations for indicating the measurements of the adjustment of the screw, a pair of reversely numbered graduated plates mounted upon the side of the carriage, a slide movable under and between the plates and connected to the member which passes through and is guided by the slot, for indicating the adjustment of the screw, and means carried by the corresponding ends of the screw and the blade for making measurements.

9. In a micrometer gauge, a blade, a carriage mounted for longitudinal adjustment upon the blade, guide tubes detachably connected to the carriage, and having their axes in the same straight line, one of said guide tubes having a guide slot, a micrometer screw guided through one of said tubes and provided with a lateral member guided in the slot of the other tube, means for adjusting the screw and including graduations for indicating the measurements of the adjustment of the screw, a pair of reversely numbered graduated plates mounted upon the side of the carriage, a slide movable under and between the plates and connected to the member which passes through and is guided by the slot, for indicating the adjustment of the screw, and means carried by the corresponding ends of the screw and the blade for making measurements, a nut or sleeve operatively mounted upon the screw and cooperating with the adjusting means for the screw, for checking up the adjustment of the micrometer screw.

10. In a micrometer gauge, a blade, a carriage mounted for longitudinal adjustment upon the blade, guide tubes detachably connected to the carriage and having their axes in the same straight line, one of said guide tubes having a guide slot, a micrometer screw guided through one of said tubes and provided with a lateral member guided in the slot of the other tube, means for adjusting the screw and including graduations for indicating the measurements of the adjustment of the screw, a pair of reversely numbered graduated plates mounted upon the side of the carriage, a slide movable under and between the plates and connected to the member which passes through and is guided by the slot, for indicating the adjustment of the screw, and means carried by the corresponding ends of the screw and the blade for making measurements, a nut or sleeve operatively mounted upon the screw and cooperating with the adjusting means for the screw, for checking up the adjustment of the micrometer screw, one end of one of the guide tubes being split longitudinally, thereby causing to be formed yieldable tongues, and means adjustable upon the split end tube for tightening the tongues against the lower part of the micrometer screw for holding the screw in position and for taking up loose play after the adjustments have been made, whereby measurements may be accurately taken.

11. In a micrometer gauge, a blade, a carriage mounted for longitudinal adjustment upon the blade, guide tubes detachably connected to the carriage and having their axes in the same straight line, one of said guide tubes having a guide slot, a micrometer screw guided through one of said tubes and provided with a lateral member guided in the slot of the other tube, means for adjusting the screw and including graduations for indicating the measurements of the adjustment of the screw, a pair of reversely numbered graduated plates mounted upon the side of the carriage, a slide movable under and between the plates and connected to the member which passes through and is guided by the slot, for indicating the adjustment of the screw, and means carried by the corresponding ends of the screw and the blade for making measurements, said carriage being reversible, whereby it may extend in a lateral direction from either edge of the blade.

12. In a micrometer gauge, a blade, a carriage mounted for longitudinal adjustment upon the blade, guide tubes detachably connected to the carriage, and having their axes in the same straight line, one of said guide tubes having a guide slot, a micrometer screw guided through one of said tubes and provided with a lateral member guided in the slot of the other tube, means for adjusting the screw and including graduations for indicating the measurements of the adjustment of the screw, a pair of reversely numbered graduated plates mounted upon the side of the carriage, a slide movable under and between the plates and connected to the member which passes through and is guided by the slot, for indicating the adjustment of the screw, a base attached to the lower end of the blade, to hold the same upright, when making measurements with the micrometer screw when it is disposed in parallelism with the blade adjacent its edge opposite the base, and means carried by the lower end of the micrometer screw cooperating with the base, when the screw is disposed immediately above the base, when making measurements.

In testimony whereof, I hereunto affix my signature.

ALBERT R. BERG.